United States Patent [19]

Lim

[11] 3,855,024

[45] Dec. 17, 1974

[54] METHOD OF VAPOR-PHASE POLISHING A SURFACE OF A SEMICONDUCTOR

[75] Inventor: Mahn-Jick Lim, Lower Makefield Township, Bucks Cty., Pa.

[73] Assignee: Western Electric Company, Incorporated, New York, N.Y.

[22] Filed: Nov. 6, 1972

[21] Appl. No.: 303,746

Related U.S. Application Data

[63] Continuation-in-part of Ser. No. 194,324, Nov. 1, 1971, abandoned.

[52] U.S. Cl. ...................... 156/17, 156/20, 252/79.1

[51] Int. Cl. ............................ H01l 7/50, C09k 3/00

[58] Field of Search ............ 156/17, 20; 117/53, 54, 117/213, 106; 134/31; 252/79.1

[56] References Cited

UNITED STATES PATENTS 2,802,760 8/1957 Derick et al. ..................... 156/17 X

*Primary Examiner*—William A. Powell

*Attorney, Agent, or Firm*—J. Rosenstock

[57] ABSTRACT

A method of vapor-phase polishing a surface of a semiconductor material, selected from the group of semiconductor materials comprising (1) group II–VI compounds, (2) group III–V compounds, (3) mixed II–VI compounds, (4) mixed III–V compounds and (5) group IV elements, is disclosed. The method includes contacting the surface of the substrate, maintained at a suitable temperature with a gaseous mixture comprising a carrier gas, e.g., hydrogen, and water for a period of time sufficient to polish the surface.

8 Claims, 2 Drawing Figures

METHOD OF VAPOR-PHASE POLISHING A SURFACE OF A SEMICONDUCTOR

This is a continuation-in-part of application Ser. No. 194,324, filed Nov. 1, 1971 now abandoned.

BACKGROUND OF THE INVENTION

1. Field of the Invention

This invention relates to a method of vapor-phase polishing a surface of a semiconductor and removing strains and impurities therefrom and more particularly, to a method of polishing gallium phosphide with a gaseous mixture comprising an inert carrier gas and water vapor.

2. Description of the Prior Art

In a single crystal epitaxial growth, utilizing liquid or vapor phase epitaxy methods, a seed crystal or substrate of an appropriate semiconductor is employed. The surface condition of the seed crystal, upon which epitaxial growth takes place, greatly affects the product resulting from the epitaxial growth. A clean, smooth and relatively strain-free face of the seed crystal or substrate is therefore essential.

Conventional cleaning and/or polishing methods, utilized in pre-treating the seed crystal, include mechanical polishing and/or liquid chemical polishing with conventional chemical reactants, e.g., bromine-methanol. However, such methods cannot be carried out in situ during a conventional gaseous epitaxial growth proces. Also, both the mechanical polishing technique and the liquid chemical polishing, e.g., polishing GaP with bromine-methanol, may lead to a surface or face which has scratches and strains which are detrimental to the final epitaxially grown product.

At present, the most commonly used methods of polishing a single crystal GaP substrate are (1) polishing the substrate with a bromine-methanol solution for the (111) P-face and (2) mechanically polishing with a slurry of water and alumina particles, of 3.0$\mu$m and 0.1$\mu$m sizes, for the (111) Ga-face. The bromine-methanol solution method, however, has certain disadvantages. The bromine-methanol solution method cannot polish the (111) Ga-face non-preferentially, it is corrosive and has undesirable aging characteristics. Mechanically polishing the (111) Ga-face of GaP results in a strained and scratched face.

Various gaseous etchants and etching techniques are known whereby semiconductor materials, such as GaAs single crystals, may be etched. As indicated in "Vapor Phase Etching of GaAs in the $H_2$-$H_2O$ Flow System," C. Lin, L. Chow and K. J. Miller, Journal of Electrochemical Society, Vol. 117, No. 3, pages 407 to 409, it is known that water vapor transported in a hydrogen gas carrier may be used to etch a GaAs substrate but not to polish the GaAs substrate. Etching involves merely a mass removal of material irregardless of what type of surface results therefrom. Etching a surface therefore cannot a priori lead to a polished surface, where polishing is defined as smoothing a surface and a polished surface is a microscopically smooth surface.

A gaseous phase process which (1) provides for in situ cleaning (removal of initial impurities) and polishing and (2) eliminates an introduction of impurities, e.g., mechanical polishing abrasives, is therefore needed.

SUMMARY OF THE INVENTION

The present invention is directed to a method of vapor phase polishing a surface of a semiconductor and removing strains and impurities therefrom and more particularly, to a method of polishing gallium phosphide with a gaseous mixture comprising an inert carrier gas and water vapor.

Briefly, the method comprises contacting a surface of a substrate, comprising a semiconductor material with a gaseous mixture comprising an inert carrier gas, e.g., hydrogen, and water for a period of time sufficient to polish the surface. The semiconductor material is one selected from the group consisting of III–V compounds, II–VI compounds, mixed III–V compounds, mixed II–VI compounds, group IV elements and compounds thereof.

DESCRIPTION OF THE DRAWING

The present invention will be more readily understood by reference to the following drawing taken in conjunction with the detailed description, wherein.

DETAILED DESCRIPTION

The present invention has been described largely in terms of polishing a single crystal gallium phosphide substrate face or surface. However, it will be understood that such description is for purposes of exposition and not for purposes of limitation. It will be readily appreciated that the inventive concept described is equally applicable to semiconductor materials selected from among group III–V compounds, group II–VI compounds, mixed crystals of III–V and II–VI compounds, or group IV elements of the Periodic Table of Elements as set forth in the Mendelyeev Periodic Table appearing on page B2 in the 45th edition of the "Handbook of Chemistry and Physics," published by the Chemical Rubber Company.

Figure 1:
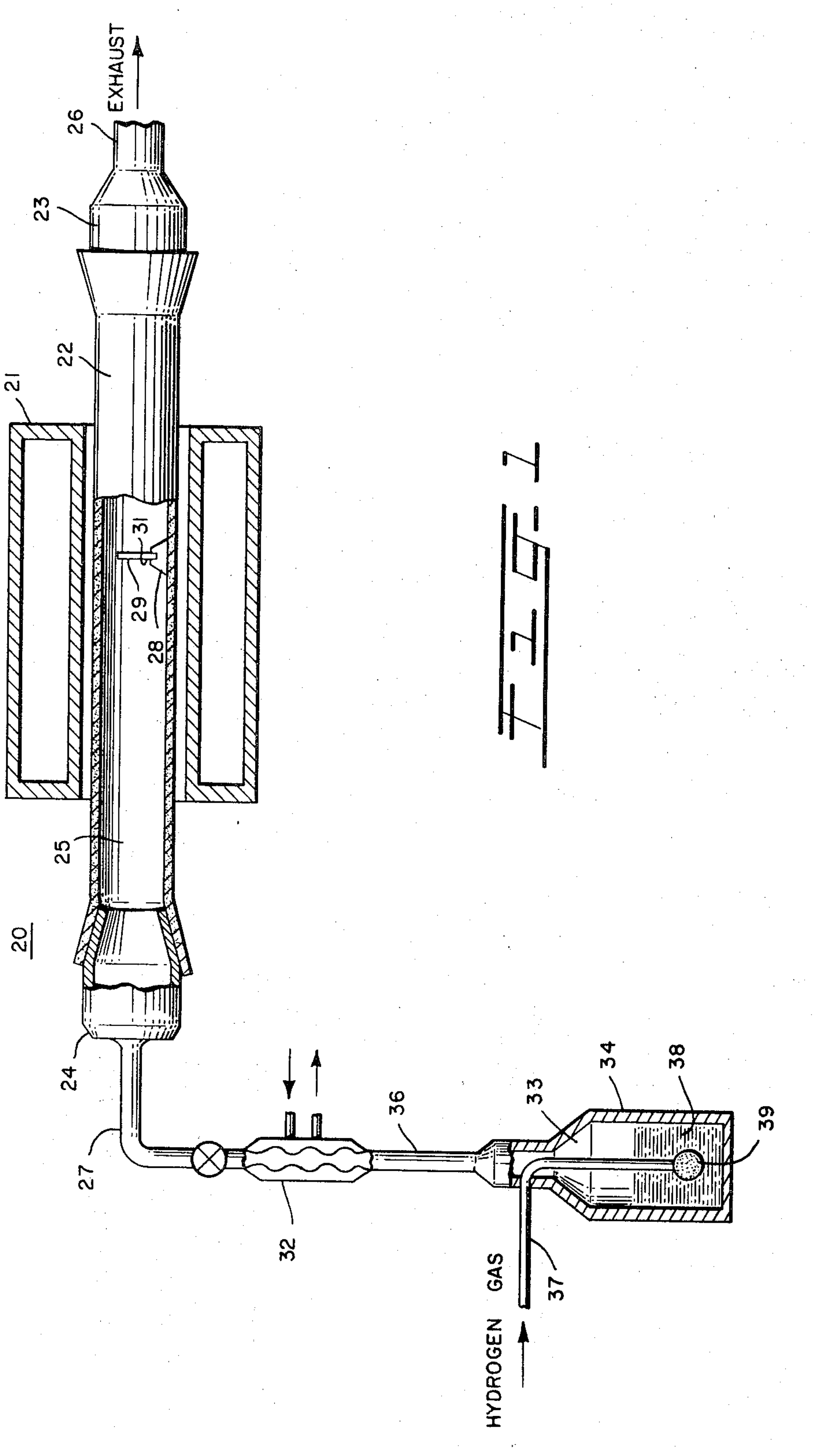
FIG. 1 is a partial cross-sectional view of a typical gaseous epitaxial growth apparatus adapted for gaseous polishing of a semiconductor substrate maintained therein.

With reference now to FIG. 1, there is shown apparatus for carrying out the method of the present invention. The apparatus 20 includes a generally cylindrical open-ended furnace 21. The furnace 21 encircles an open reaction tube 22 which is fabricated from a refractory material, e.g., alumina, quartz, boron nitride, etc. Any temperature profile may be impressed on the interior of the reaction tube 22 by selectively controlling a conventional heat source (not shown).

The ends of the reaction tube 22 are sealed by appropriate plugs or end pieces 23 and 24. Plug 23 carries an exhaust port 26 which communicates through plug 23 with the interior 25 of the reaction tube 22. Maintained within the reaction tube 22, by means of a holder 28, is a semiconductor seed crystal or substrate 29, e.g., a single crystal GaP wafer, a single crystal GaAs wafer, etc. The holder 28 may comprise any standard holder or holding means known in the art which has the ability to maintain a face or surface 31 of the semiconductor substrate 29 in a position whereby it, i.e., the face 31, may be conveniently polished by a gaseous mixture to which it is destined to be exposed or contacted with.

Passing through plug 24 and communicating with the interior 25 of the reaction tube 22, is an inlet tube 27. The inlet tube 27 is affixed by conventional means (not shown) to a conventional condenser 32, which in turn communicates with the interior 33 of a container 34, by means of an outlet tube or port 36 of the container 34.

In operation, an inert carrier gas, i.e., a gas which doesn't react with the semiconductor substrate, e.g., $H_2$, A, $N_2$, He, etc., is passed from a conventional source (not shown) through an inlet tube 37 into the conainer 34 containing water 38. Affixed at the end of the inlet tube 37, contained within container 34 and immersed in the water 38, is a conventional fritted bubbler 39, typically having a pore size of 20–50$\mu$. The container 34 is surrounded by a conventional heating or cooling means (not shown) which maintains the water 38 at a fixed first temperature.

The inert carrier gas, e.g., hydrogen, passes through the bubbler 39 through the water 38, whereby the carrier gas, e.g., $H_2$, becomes mixed with a sufficient amount of water vapor at the first temperature at which the container 34 and the water 38 contained therein are maintained. The carrier gas mixed with water vapor then passes through the outlet tube or port 36 of the container 34 into the condenser 32 which is maintained at a desired second temperature which is lower than the first temperature. The condenser 32 is maintained at the second temperature by any conventional heating or cooling means (not shown) known in the art. Excess water contained in the carrier gas then condenses out and the carrier gas has therein a constant water concentration, typically, for polishing a GaP substrate face, being in a critical pressure range of from about 0.286 mm Hg to 11.23 mm Hg, at a polishing temperature of 1050°C, where the total pressure of the carrier gas, e.g., $H_2$, and the water vapor is approximately one atmosphere (760 mm Hg). That is, the water is present in a volume concentration ranging from about 377 ppm to about 14,800 ppm of water in the carrier gas. Above 11.23 mm Hg water pressure at a temperature of 1,050° C, a pitted, etched surface 31 of a single crystal GaP substrate 29 is obtained rather than a polished surface having a smooth finish. A rough GaP face 31 having Ga bubbles on the surface occurs below 0.286 mm Hg water pressure at a temperature of 1050°C. It is, of course, understood that the water concentration and the temperature at which the substrate 29 is polished are interdependent and that variations in the temperature will produce variations in the other parameter whereby polishing and not etching will be attained. In this regard, the interdependency of polishing temperature and water concentration can be easily ascertained by one skilled in the art in the light of the invention disclosed herein. It is also to be understood that the temperature at which the condenser 32 is maintained is determined by the standard vapor pressure-temperature data of water which is well known in the art. From the condenser 32 the water vapor saturated carrier gas, e.g., $H_2$, passes through inlet tube 27 into the interior 25 of the reaction tube 22.

The temperature of the furnace 21 and thus the reaction tube 22 and substrate 29 is maintained at a suitable temperature for polishing the surface or face 31 of the substrate 29. Typically, for GaP, a suitable temperature is one ranging from 800°C to 1,350°C, a practical, operational temperature ranging from 1,000°C to 1,200°C. The gaseous mixture of the carrier gas, e.g., hydrogen and water contacts the substrate face 31, maintained at a suitable temperature, for a period of time sufficient to react therewith and form a polished surface. Typically, a sufficient period of time for polishing GaP single crystal substrates, e.g., n-type, p-type, undoped, ranges from 5 minutes to 2 hours at a temperature of 1,050°C, a water vapor pressure ranging from about 0.286 mm Hg to about 11.23 mm Hg, and a gaseous mixture flow rate of 400 cc/minutes.

It is, of course, understood that the polishing exposure time to the gaseous mixture, comprising the carrier gas, e.g., hydrogen, and water vapor is interdependent on temperature, water vapor concentration or pressure and the flow rate of the gaseous mixture, and the time periods given above for a temperature of 1,050°C, for the water vapor pressure range of 0.286 mm Hg to 11.23 mm Hg and for the flow rate of 400 cc/minute is exemplary only and is not limiting. In this regard, the various parameters and their interdependency are well known in the art or can be easily ascertained by one skilled therein.

It is, of course, understood that the inventive polishing technique, described above, can be employed in situ prior to a compatible epitaxial growth upon the resulting polished semiconductor substrate or seed crystal 29.

It is to be noted that a conventionally polished, including a bromine-methanol solution polished, surface 31 of the substrate 29, e.g., GaP, upon exposure to water vapor polishing, as described above, first becomes roughened upon exposure to temperatures in the range of from about 800°C to 1,350°C, and is then polished. In contrast, however, if the substrate 29 has been polished by the above-described inventive water vapor polishing technique, re-exposure to water vapor, e.g., within the water vapor partial pressure limits of 0.286 mm Hg to 11.23 mm Hg at the temperature of 1,050°C, will not result in roughening of the surface 31.

It has been hypothesized that the substrate 29, comprising the semiconductor material, e.g., group III–V compound, group II–VI compound, group IV element, etc., reacts with water vapor to form a gaseous species, e.g., an oxide. The group V or VI elements form a gaseous species e.g., $P_2$. For example, in the case of GaP, it is hypothesized that the following reaction occurs:

$$2\text{GaP}(s) + \text{H}_2\text{O}(g) = \text{Ga}_2\text{O}(g) + P_2(g) + H_2(g).$$

Specific examples of polishing a surface of a substrate comprising a semiconductor are as follows:

EXAMPLE I

A. A 14 mil. thick single crystal, intentionally undoped, GaP substrate (n-type, net carrier concentration of about 1 to 2 × $10^{15}$/cc, background impurity) was maintained at a temperature of 1,050°C in an apparatus similar to that described in FIG. 1. A (111) A face 31 of the substrate 29 which had been previously mechanically polished and contained strains, scratch marks and impurities therein was exposed, at 1.050°C, to a gaseous mixture comprising hydrogen and water maintained at approximately one atmosphere of pressure (a slight over pressure was employed to maintain a constant flow of 400 cc/minute of the gaseous mixture through the apparatus). The hydrogen gas was saturated with water at a temperature of 0°C, thereby giving a water pressure of 4.6 mm Hg. The A face of the GaP single crystal refers to the gallium-exposed face. After 5 minutes of exposure, a polished (as determined by optical microscopic examination), relatively strain-free and impurity-free surface or face 31 was obtained.

B. The procedure of Example I-A was repeated except that the crystal was an n-type GaP crystal (doped with Te at the carrier concentration or level of about $8 \times 10^{17}$ to $7 \times 10^{18}$/cc). The exposure was for 15 minutes at 1,050°C. A good polish of the surface 31 (as determined by optical microscopic examination), which was relatively strain free and impurity-free, was obtained.

C. The procedure of Example I-A was repeated except that the crystal was a p-type GaP crystal (doped with Zn at a level of about $4 \times 10^{17}$ to $6 \times 10^{17}$/cc). The saturation of the hydrogen was carried out at a temperature of 6°C (water pressure = 7.01 mm Hg). An exposure to the gaseous mixture for at least 10 minutes at a temperature of 1,050°C gave a polished (as determined by optical microscopic examination), relatively strain-free and impurity-free surface 31.

D. The procedure of Example I-C was repeated except that the exposure was for 15 minutes at 1,050°C. A good, relatively strain and impurity-free polish of the face 31 was obtained (as determined by optical microscopic examination).

E. The procedure of Examine I-C was repeated except that the exposure was for 20 minutes at 1,050°C. An excellent polish (mirror finish, as determined by (1) optical microscopic examination and (2) transmission electron microscope examination of a carbon-platinum direct replica of the surface 31), relatively strain and impurity free, of the surface 31, was obtained.

EXAMPLE II

A. The procedure of Example I-A was repeated except that the crystal was the n-type GaP crystal of Example I-B, and the substrate face 31 treated or etched was the (111) B face, where the B face is the phosphorus exposed face. The B face 31 had previously been chemically polished with a solution comprising bromine and methanol, using a conventional technique. After an exposure of 10 minutes at 1,050°C, a polished face 31 (as determined by optical microscopic examination), relatively strain free and impurity free was obtained.

B. The procedure of Example II-A was repeated except that the exposure was for 15 minutes at 1,050°C. A good polish (as determined by optical microscopic examination), relatively strain free and impurity free was obtained of the face 31.

C. The procedure of Example II-A was repeated except that the crystal was the p-type GaP crystal of Example I-C. The hydrogen gas saturation was carried out at 6°C whereby the water pressure obtained was 7.01 mm Hg. After an exposure of 15 minutes at 1,050°C, a good polish (as determined by optical microscopic examination), relatively strain free and impurity free was obtained of the face 31.

D. The procedure of Example II-C was repeated except that the exposure was for 20 minutes at 1,050°C. An excellent polish (mirror finish, as determined by (1) optical microscopic examination and (2) transmission electron microscope examination of a carbon-platinum direct replica of the surface 31), relatively strain free and impurity free, was obtained of the surface or face 31.

E. The procedure of Example II-C was repeated except that the hydrogen gas saturation was carried out at 10°C, whereby the water pressure obtained was 9.21 mm Hg. After an exposure of 10 minutes at 1,050°C, an excellent polish (mirror finish, as determined by (1) optical microscopic examination and (2) transmission electron microscope examination of a carbon-platinum direct replica of the surface 31), relatively strain free and impurity free, was obtained of the face 31.

F. The procedure of Example II-A was repeated except that the hydrogen gas saturation was carried out at 12°C, whereby a water pressure of 10.53 mm Hg was obtained. After treating the face 31 for 5 minutes, a good polish thereof (as determined by optical microscopic examination), relatively strain free and impurity free, was obtained.

G. The procedure of Example II-A was repeated except that the hydrogen gas saturation was carried out at 13°C, whereby a water pressure of 11.23 mm Hg was obtained. After an exposure of 10 minutes, an excellent (mirror finish) polish (as determined by (1) optical microscopic examination and (2) transmission electron microscope examination of a carbon-platinum direct replica of the surface 31), relatively strain free and impurity free, of the surface 31 was obtained.

H. The procedure of Example II-G was repeated except that the substrate was the p-type GaP crystal of Example I-C. After an exposure of 10 minutes, an excellent (mirror finish) polish (as determined by optical microscopic examination), relatively strain free and impurity free of the surface 31 was obtained.

I. The procedure of Example II-C was repeated except that the hydrogen gas saturation was carried out at 0°C, whereby a water pressure of 4.6 mm Hg was obtained. The B face 31 of the substrate 29 was exposed to the gaseous mixture at a temperature of 1,130°C for 32 minutes whereby a mirror smooth face 31 (as determined by optical microscopic examination), relatively strain and impurity free was obtained.

J. The procedure of Example II-C was repeated except that the hydrogen gas saturation was carried out at 0°C, whereby a water pressure of 4.6 mm Hg was obtained. The B face 31 of the substrate 29 was exposed to the gaseous mixture at a temperature of 1,010°C for 3 hours whereby a good polish (as determined by optical microscopic examination) of the face 31, which was relatively impurity and strain free, was obtained.

K. The procedure of Example II-B was repeated except that the crystal was an n-type GaP crystal doped with Se at the carrier concentration or level of about $2.7 \times 10^{17}$ to $2.6 \times 10^{18}$/cc. The B face of the crystal had previously been chemically polished with a solution comprising bromine and methanol, using a conventional technique. Thirty cubic centimeters of hydrogen saturated with water at 0°C was mixed with 370 cubic centimeters of dry hydrogen gas, resulting in a gaseous mixture comprising 452 ppm of water vapor (0.34 mm Hg) and remainder of hydrogen. The surface 31 was exposed to the gaseous mixture at 1,050°C for two hours resulting in an excellent polish (mirror finish, as determined by optical microscopic examination) of the surface 31, which was relatively impurity free and strain free.

L. The procedure of Example II-K was repeated except that 25 cubic centimeters of hydrogen gas saturated with water vapor at 0°C was mixed with 375 cubic centimeters of dry hydrogen resulting in a gas mixture having 377 parts per million of water vapor (0.286 mm Hg.). After one hour a good polish (as determined by optical microscopic examination) of the surface 31 was obtained at a temperature of 1,050°C.

M. For comparison purposes the procedure of Example II-A was repeated except that the hydrogen gas saturation was carried out at 20°C, whereby a water pressure of 17.53 mm Hg was obtained. A pitted face 31 was obtained after 5 minutes at 1,050°C, as determined by optical microscopic examination.

N. For comparison purposes, the procedure of Example II-C was repeated except that the hydrogen gas saturation was carried out at 14°C, whereby a water pressure of 11.99 mm Hg was obtained. A pitted face 31 was obtained after 10 minutes at 1,050°C, as determined by optical microscopic examination.

O. For comparison purposes, the procedure of Example II-A was repeated except that the hydrogen gas saturation was carried out at 15°C, whereby a water pressure of 12.79 mm Hg was obtained. A pitted face 31 was obtained after 10 minutes at 1,050°C, as determined by optical microscopic examination.

P. For comparison purposes, the procedure of Example I-C was repeated except that the hydrogen gas saturation was carried out at 16°C, whereby a water pressure of 13.63 mm Hg was obtained. A pitted face 31 was obtained after 10 minutes at 1,050°C, as determined by optical microscopic examination.

EXAMPLE III

A. The procedure of Example II-A was repeated except that the substrate was an unpolished, saw-cut, n-type GaP slice (doped with Te at the level of about $2 \times 10^{17}$ to $6 \times 10^{17}$/cc) of approximately 14 mils in thickness. After an exposure of 30 minutes at 1,050°C, a polished B face 31 (as evidenced by optical microscopic examination), relatively strain free, was obtained.

B. The procedure of Example III-A was repeated. After an exposure of 75 minutes an excellent polish (mirror finish, as evidenced by optical microscopic examination), relatively strain free, of the surface 31 was obtained.

C. The procedure of Example III-A was repeated except that the saw-cut sample (n-type, Se doped at the level of about $2.6 \times 10^{17}$ to $2.6 \times 10^{18}$/cc) was first immersed in a boiling trichloroethylene bath for 10 minutes, followed by immersion for 10 minutes in a boiling acetone bath, followed by immersion for 10 minutes in deionized water bath, followed by immersion for 10 minutes in a boiling isopropyl alcohol bath and finally followed by immersion in an aque regia bath (25°C) for 10 minutes. The sample was then flushed with deionized water (25°C) for 10 minutes, immersed in isopropyl alcohol (25°C) for 3 minutes and then dried by blowing high purity argon over the surfaces. Both the A face and the B face of the sample were exposed to the gaseous mixture (4.6 mm Hg of $H_2O$) at a temperature of 1,100°C for 30 minutes. Both the A face and the B-face were mirror smooth (as determined by optical microscopic examination) and were relatively strain and impurity free.

EXAMPLE IV

A. An unpolished, saw-cut, n-type GaP single crystal slice (14 mil thick), doped with Se at the level of about $2.7 \times 10^{17}$ to $2.6 \times 10^{18}$/cc, was selected. The slice was immersed in a boiling trichloroethylene bath for 10 minutes, followed by immersion for 10 minutes each in two acetone baths at 25°C, followed by immersion for 2 minutes each in two isopropyl alcohol baths at 25°C. The slice was flushed with deionized water for 10 minutes at 25°C, immersed in three baths of isopropyl alcohol for 3 minutes at 25°C each, and dried by blowing high purity argon over the surfaces. The procedure of Example II-A was then repeated for 30 minutes at a temperature of 1,100°C with a gaseous mixture comprising $H_2$ and $H_2O$ (4.6 mm Hg).

The identity and relative concentration of surface impurities on the surface of the selected slice were determined both for the as saw-cut sample, after cleaning with the various solutions described in the above paragraph, and for the sample after subsequent polishing thereof with the gaseous mixture. The measurement of the impurities was carried out with a commercially available ion microprobe mass analyzer which scanned the surface thereby providing a mass spectrum thereof. The mass spectrum was then digitalized by means of a commercially available data aquisition system utilizing an averaging technique to obtain representative relative values of surface impurities.

Figure 2:
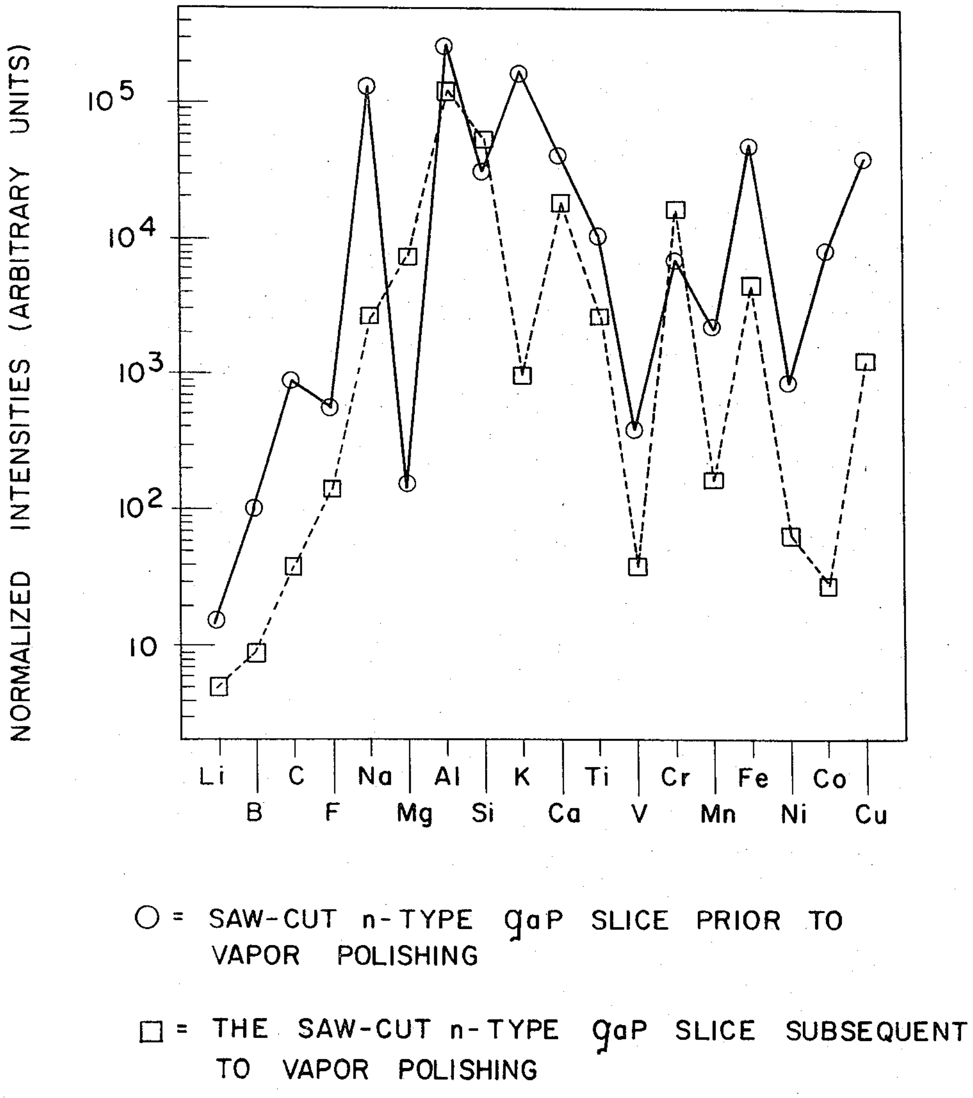
FIG. 2 is a graph illustrating mass spectrum intensity levels of various elements contained on a surface of a GaP sample, prior to gaseous polishing thereof and subsequent to gaseous polishing thereof.

The results of the impurity measurements, by means of the ion analyzer, as illustrated in FIG. 2, indicated that vapor polishing of a GaP substrate with water vapor leads to an overall reduction of surface impurities, i.e., an overall improvement of surface cleanliness. FIG. 2 is a plot of normalized mass spectral intensities for each impurity element, contained on the face of the selected slice prior to vapor polishing (designated as the circle plot) and after vapor polishing (designated as the square plot).

EXAMPLE V

A. An unpolished, saw-cut, n-type GaP single crystal slice (14 mil thick), doped with Se at the level of about $2.7 \times 10^{17}$ to $2.6 \times 10^{18}$/cc was selected. The B face of the slice was polished, using a conventional technique, in a solution comprising bromine and methanol. The slice or substrate 29 was inserted in the apparatus 20, described in FIG. 1. The substrate 29 was maintained within the reaction tube 22 of the apparatus 20 by means of holder 28. The B face 31 of the substrate 29 was then exposed at 1,050°C to a gaseous mixture comprising hydrogen and water vapor (4.6 mm Hg), introduced into the reaction tube 22 of the apparatus 20 at a rate of 400 cc/min. The substrate 29 was maintained at 1,050°C under the gaseous mixture ambient for 40 minutes, whereafter the holder 28 was pulled toward the cold end of the reaction tube 22, i.e., towards the plug 24. After 30 minutes at the cold end of the reaction tube 22, under the gaseous mixture ambient, the holder 28 and substrate 29 were pushed back toward the region of the reaction tube maintained at 1,050°C. The substrate 29 was maintained at 1,050°C for 3 minutes under the gaseous mixture ambient and then removed from the reaction tube 22, after cooling at the cold end. Optical examination of the B face 31 revealed an excellent (mirror finish) polished surface.

B. For comparison purposes, the procedure of Example V-A was repeated except that the substrate 29, polished using a conventional technique in a solution comprising bromine and methanol, was exposed only once to the gaseous ambient at a temperature of 1,050°C. The period of exposure was 3 minutes. The resulting surface 31 was rough upon optical microscopic examination.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A method of polishing a surface of a substrate comprising a semiconductor material, which comprises, contacting the surface of the substrate, maintained at a suitable temperature, with a gaseous mixture comprising a carrier gas and water vapor for a period of time sufficient to polish the surface.

2. The method as defined in claim 1 wherein the substrate comprises single crystal GaP.

3. The method as defined in claim 2 wherein said GaP substrate is maintained at a temperature ranging from 800°C to 1,350°C.

4. The method as defined in claim 2, wherein:

said substrate is maintained at a temperature of about 1,050°C; and said gaseous mixture, at a pressure of 760 mm Hg, comprises from about 0.286 mm Hg to about 11.23 mm Hg of water vapor and remainder carrier gas.

5. A method of improving the quality of a surface of a substrate comprising GaP, which comprises:

a. heating the substrate to a temperature ranging from about 800°C to about 1,350°C; and b. exposing said heated surface to a gaseous mixture comprising a carrier gas and water, for a period of time sufficient to react with the surface.

6. The method as defined in claim 5 wherein:

said temperature is about 1,050°C; and said gaseous mixture, at a pressure of 760 mm Hg, comprises from about 0.286 mm Hg to about 11.23 mm Hg of water vapor and remainder hydrogen.

7. A method of rendering a surface of a semiconductor material, comprising single crystal GaP, relatively impurity free, which comprises, contacting the surface maintained at a suitable temperature, with a gaseous mixture comprising a carrier gas and water vapor.

8. The method as defined in claim 7 wherein:

said surface is maintained at a temperature ranging from about 800°C to about 1,350°C.

* * * * *